United States Patent
Grosskopf et al.

(10) Patent No.: US 10,038,719 B2
(45) Date of Patent: Jul. 31, 2018

(54) SINGLE-STEP CUSTOM CONFIGURATION OF A CLOUD CLIENT DEVICE

(71) Applicant: Dell Products L.P., Round Rock, TX (US)

(72) Inventors: Gabriel Jakobus Grosskopf, Palo Alto, CA (US); Richard Graham Cook, San Jose, CA (US); Leela Seshu Reddy Cheedepudi, Santa Clara, CA (US)

(73) Assignee: Dell Products L.P., Round Rock, TX (US)

( * ) Notice: Subject to any disclaimer, the term of this patent is extended or adjusted under 35 U.S.C. 154(b) by 284 days.

(21) Appl. No.: 14/265,217

(22) Filed: Apr. 29, 2014

(65) Prior Publication Data

US 2015/0312275 A1 Oct. 29, 2015

(51) Int. Cl.
| | |
|---|---|
| G06F 21/62 | (2013.01) |
| H04L 29/06 | (2006.01) |
| H04L 12/24 | (2006.01) |
| H04L 29/08 | (2006.01) |
| H04W 4/50 | (2018.01) |
| H04W 4/00 | (2018.01) |

(52) U.S. Cl.
CPC .............. *H04L 63/20* (2013.01); *G06F 21/62* (2013.01); *H04L 41/0813* (2013.01); *H04L 41/28* (2013.01); *H04L 67/10* (2013.01); *H04L 67/34* (2013.01); *H04W 4/001* (2013.01); *H04W 4/50* (2018.02)

(58) Field of Classification Search
None
See application file for complete search history.

(56) References Cited

U.S. PATENT DOCUMENTS

| | | | |
|---|---|---|---|
| 8,214,653 B1* | 7/2012 | Marr | G06F 21/572 380/286 |
| 9,348,615 B1* | 5/2016 | Clark | G06F 9/4446 |
| 2004/0093598 A1* | 5/2004 | Haga | G06F 8/65 717/173 |
| 2004/0131185 A1* | 7/2004 | Kakumer | H04L 63/08 380/247 |
| 2004/0255137 A1* | 12/2004 | Ying | H04L 63/0442 713/193 |
| 2006/0010325 A1* | 1/2006 | Liu | G06F 21/33 713/173 |
| 2006/0073820 A1* | 4/2006 | Craswell | G06F 8/65 455/419 |
| 2007/0121869 A1* | 5/2007 | Gorti | H04L 29/06027 379/201.02 |
| 2007/0261047 A1* | 11/2007 | Sah | G06F 8/65 717/168 |
| 2008/0173709 A1* | 7/2008 | Ghosh | G06F 21/34 235/382 |
| 2009/0228703 A1* | 9/2009 | Grajek | H04L 9/3268 713/156 |

(Continued)

*Primary Examiner* — Kim Huynh
*Assistant Examiner* — Danny Chan
(74) *Attorney, Agent, or Firm* — Baker Botts L.L.P.

(57) ABSTRACT

In one embodiment, a cloud client device identifies a configuration event. The cloud client device identifies a configuration associated with the configuration event. The cloud client device stores a first security key associated with the configuration and configures the cloud client device in accordance with the configuration.

11 Claims, 2 Drawing Sheets

(56) References Cited

U.S. PATENT DOCUMENTS

| | | | | |
|---|---|---|---|---|
| 2009/0327708 A1* | 12/2009 | Hazlewood | ......... | H04L 63/0823 |
| | | | | 713/158 |
| 2010/0057703 A1* | 3/2010 | Brandt | .................... | G06F 21/10 |
| | | | | 707/E17.014 |
| 2011/0072270 A1* | 3/2011 | Little | ...................... | H04L 12/66 |
| | | | | 713/175 |
| 2011/0161881 A1* | 6/2011 | Tomita | ............... | H04N 1/00408 |
| | | | | 715/825 |
| 2011/0296414 A1* | 12/2011 | Hinojosa | ............. | G06F 21/6218 |
| | | | | 718/100 |
| 2012/0036282 A1* | 2/2012 | Chen | ................... | H04L 63/0428 |
| | | | | 710/9 |
| 2012/0204245 A1* | 8/2012 | Ting | ........................ | G06F 21/35 |
| | | | | 726/6 |
| 2012/0252531 A1* | 10/2012 | King | .................... | H04L 63/062 |
| | | | | 455/558 |
| 2012/0276872 A1* | 11/2012 | Knauth | ................... | H04L 63/18 |
| | | | | 455/411 |
| 2012/0321084 A1* | 12/2012 | Le Saint | ............... | H04L 9/3234 |
| | | | | 380/277 |
| 2013/0185564 A1* | 7/2013 | Jaber | ........................ | G06F 21/57 |
| | | | | 713/176 |
| 2013/0291093 A1* | 10/2013 | Matsuoka | ............. | H04L 9/3231 |
| | | | | 726/19 |
| 2014/0075185 A1* | 3/2014 | Dragomir | ............. | H04L 9/3268 |
| | | | | 713/156 |
| 2014/0109076 A1* | 4/2014 | Boone | ....................... | G06F 8/65 |
| | | | | 717/170 |
| 2014/0149572 A1* | 5/2014 | Menezes | ................ | H04L 43/12 |
| | | | | 709/224 |
| 2014/0222493 A1* | 8/2014 | Mohan | ............. | G06Q 10/06316 |
| | | | | 705/7.26 |
| 2015/0244707 A1* | 8/2015 | Bowen | ................ | H04L 63/0823 |
| | | | | 713/158 |

* cited by examiner

SINGLE-STEP CUSTOM CONFIGURATION OF A CLOUD CLIENT DEVICE

TECHNICAL FIELD

This disclosure relates generally to portable information handling systems and, more particularly, to wireless-enabled, portable devices.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more information handling systems, data storage systems, and networking systems.

BRIEF DESCRIPTION OF THE DRAWINGS

For a more complete understanding of the present invention and its features and advantages, reference is now made to the following description, taken in conjunction with the accompanying drawings, in which.

DESCRIPTION OF EXAMPLE EMBODIMENTS

In the following description, details are set forth by way of example to facilitate discussion of the disclosed subject matter. It should be apparent to a person of ordinary skill in the field, however, that the disclosed embodiments are exemplary and not exhaustive of all possible embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, entertainment, or other purposes. For example, an information handling system may be a personal computer (e.g. desktop or laptop), tablet computer, mobile device (e.g. personal digital assistant (PDA) or smart phone), server (e.g. blade server or rack server), a consumer electronic device, a network storage device, or another suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more storage devices, one or more communications ports (e.g. network ports) for communicating with external devices as well as various input and output (I/O) devices, such as a keyboard, a mouse, a touchscreen and/or a video display. The information handling system may also include one or more buses operable to transmit communication between the various hardware components.

Herein, a computer-readable non-transitory storage medium or media may include one or more semiconductor-based or other integrated circuits (ICs) (such as, for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Particular embodiments are best understood by reference to FIGS. 1-5 wherein like numbers are used to indicate like and corresponding parts.

Figure 1:
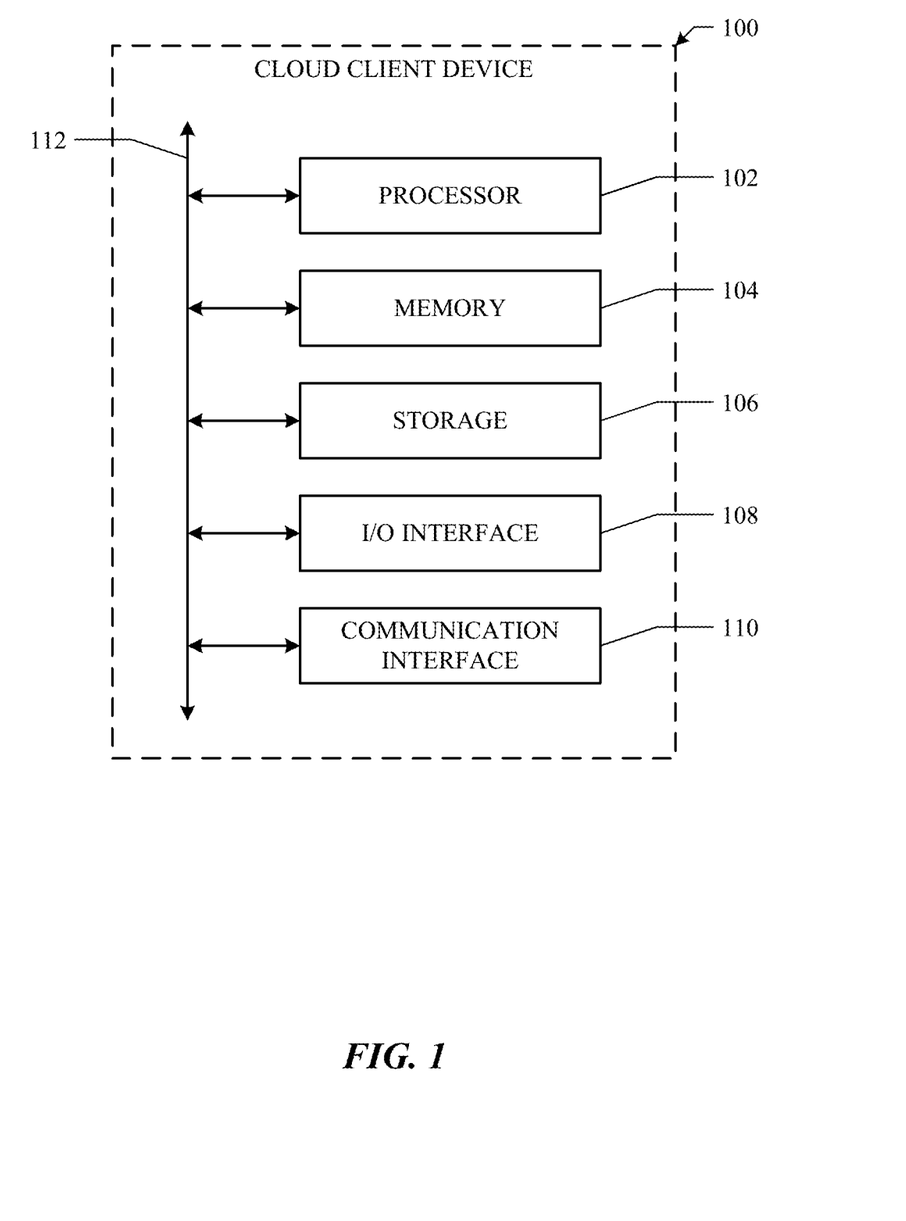
FIG. 1 is a block diagram of selected elements of an embodiment of a cloud client device.

FIG. 1 illustrates an example information handling system 100. In particular embodiments, one or more information handling systems 100 perform one or more steps of one or more methods described or illustrated herein. In particular embodiments, one or more information handling systems 100 provide functionality described or illustrated herein. In particular embodiments, software running on one or more information handling systems 100 performs one or more steps of one or more methods described or illustrated herein or provides functionality described or illustrated herein. Particular embodiments include one or more portions of one or more information handling systems 100. Herein, reference to an information handling system may encompass a computing device, and vice versa, where appropriate. Moreover, reference to an information handling system may encompass one or more information handling systems, where appropriate.

This disclosure contemplates any suitable number of information handling systems 100. This disclosure contemplates information handling system 100 taking any suitable physical form. As an example and not by way of limitation, information handling system 100 may be an embedded information handling system, a system-on-chip (SOC), a single-board information handling system (SBC) (such as, for example, a computer-on-module (COM) or system-on-module (SOM)), a desktop information handling system, a laptop or notebook information handling system, an interactive kiosk, a mainframe, a mesh of information handling systems, a mobile telephone, a personal digital assistant (PDA), a server, a tablet information handling system, or a combination of two or more of these. Where appropriate, information handling system 100 may include one or more information handling systems 100; be unitary or distributed; span multiple locations; span multiple machines; span multiple data centers; or reside in a cloud, which may include one or more cloud components in one or more networks. Where appropriate, one or more information handling systems 100 may perform without substantial spatial or temporal limitation one or more steps of one or more methods described or illustrated herein. As an example and not by way of limitation, one or more information handling systems 100 may perform in real time or in batch mode one or more steps of one or more methods described or illustrated herein. One or more information handling systems 100 may perform at different times or at different locations one or more steps of one or more methods described or illustrated herein, where appropriate.

In particular embodiments, information handling system 100 includes a processor 102, memory 104, storage 106, an input/output (I/O) interface 108, a communication interface 110, and a bus 112. Although this disclosure describes and illustrates a particular information handling system having a particular number of particular components in a particular arrangement, this disclosure contemplates any suitable information handling system having any suitable number of any suitable components in any suitable arrangement.

In particular embodiments, processor 102 includes hardware for executing instructions, such as those making up a computer program. As an example and not by way of limitation, to execute instructions, processor 102 may retrieve (or fetch) the instructions from an internal register, an internal cache, memory 104, or storage 106; decode and execute them; and then write one or more results to an internal register, an internal cache, memory 104, or storage 106. In particular embodiments, processor 102 may include one or more internal caches for data, instructions, or addresses. This disclosure contemplates processor 102 including any suitable number of any suitable internal caches, where appropriate. As an example and not by way of limitation, processor 102 may include one or more instruction caches, one or more data caches, and one or more translation lookaside buffers (TLBs). Instructions in the instruction caches may be copies of instructions in memory 104 or storage 106, and the instruction caches may speed up retrieval of those instructions by processor 102. Data in the data caches may be copies of data in memory 104 or storage 106 for instructions executing at processor 102 to operate on; the results of previous instructions executed at processor 102 for access by subsequent instructions executing at processor 102 or for writing to memory 104 or storage 106; or other suitable data. The data caches may speed up read or write operations by processor 102. The TLBs may speed up virtual-address translation for processor 102. In particular embodiments, processor 102 may include one or more internal registers for data, instructions, or addresses. This disclosure contemplates processor 102 including any suitable number of any suitable internal registers, where appropriate. Where appropriate, processor 102 may include one or more arithmetic logic units (ALUs); be a multi-core processor; or include one or more processors 102. Although this disclosure describes and illustrates a particular processor, this disclosure contemplates any suitable processor.

In particular embodiments, memory 104 includes main memory for storing instructions for processor 102 to execute or data for processor 102 to operate on. As an example and not by way of limitation, information handling system 100 may load instructions from storage 106 or another source (such as, for example, another information handling system 100) to memory 104. Processor 102 may then load the instructions from memory 104 to an internal register or internal cache. To execute the instructions, processor 102 may retrieve the instructions from the internal register or internal cache and decode them. During or after execution of the instructions, processor 102 may write one or more results (which may be intermediate or final results) to the internal register or internal cache. Processor 102 may then write one or more of those results to memory 104. In particular embodiments, processor 102 executes only instructions in one or more internal registers or internal caches or in memory 104 (as opposed to storage 106 or elsewhere) and operates only on data in one or more internal registers or internal caches or in memory 104 (as opposed to storage 106 or elsewhere). One or more memory buses (which may each include an address bus and a data bus) may couple processor 102 to memory 104. Bus 112 may include one or more memory buses, as described below. In particular embodiments, one or more memory management units (MMUs) reside between processor 102 and memory 104 and facilitate accesses to memory 104 requested by processor 102. In particular embodiments, memory 104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 104 may include one or more memories 104, where appropriate. Although this disclosure describes and illustrates particular memory, this disclosure contemplates any suitable memory.

In particular embodiments, storage 106 includes mass storage for data or instructions. As an example and not by way of limitation, storage 106 may include a hard disk drive (HDD), a floppy disk drive, flash memory, an optical disc, a magneto-optical disc, magnetic tape, or a Universal Serial Bus (USB) drive or a combination of two or more of these. Storage 106 may include removable or non-removable (or fixed) media, where appropriate. Storage 106 may be internal or external to information handling system 100, where appropriate. In particular embodiments, storage 106 is non-volatile, solid-state memory. In particular embodiments, storage 106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 106 taking any suitable physical form. Storage 106 may include one or more storage control units facilitating communication between processor 102 and storage 106, where appropriate. Where appropriate, storage 106 may include one or more storages 106. Although this disclosure describes and illustrates particular storage, this disclosure contemplates any suitable storage.

In particular embodiments, I/O interface 108 includes hardware, software, or both, providing one or more interfaces for communication between information handling system 100 and one or more I/O devices. Information handling system 100 may include one or more of these I/O devices, where appropriate. One or more of these I/O devices may enable communication between a person and information handling system 100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 108 for them. Where appropriate, I/O interface 108 may include one or more device or software drivers enabling processor 102 to drive one or more of these I/O devices. I/O interface 108 may include one or more I/O interfaces 108, where appropriate. Although this disclosure describes and illustrates a particular I/O interface, this disclosure contemplates any suitable I/O interface.

In particular embodiments, communication interface 110 includes hardware, software, or both providing one or more interfaces for communication (such as, for example, packet-based communication) between information handling system 100 and one or more other information handling systems 100 or one or more networks. As an example and not by way of limitation, communication interface 110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 110 for it. As an example and not by way of limitation, information handling system 100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, information handling system 100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Information handling system 100 may include any suitable communication interface 110 for any of these networks, where appropriate. Communication interface 110 may include one or more communication interfaces 110, where appropriate. Although this disclosure describes and illustrates a particular communication interface, this disclosure contemplates any suitable communication interface.

In particular embodiments, bus 112 includes hardware, software, or both coupling components of information handling system 100 to each other. As an example and not by way of limitation, bus 112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 112 may include one or more buses 112, where appropriate. Although this disclosure describes and illustrates a particular bus, this disclosure contemplates any suitable bus or interconnect.

In particular embodiments, information handling system 100 comprises a cloud client device (CCD). A CCD may be a wireless-enabled, portable device that may include one or more processors 102 (e.g. dual core ARM processors), volatile memory 104 (e.g. RAM), non-volatile memory 104 (e.g. flash memory), input/output interfaces 108 (e.g. for display, for data, and for audio), networking/communications interfaces 110, and one or more operating systems (e.g. stored in memory 104 and operated on by processors 102). The input/output interfaces 108 may include display interfaces that support one or more of the Mobile High-Definition Link (MHL) standard, the High Definition Multimedia Interface (HDMI) standard, or the Display Port (DP) standard. The input/output interfaces 108 may also include one or more USB ports (e.g. standard, mini or micro USB), one or more removable memory slots (e.g. SD card slots), and audio capabilities through the MHL, HDMI, or DP interfaces. The CCD may include networking or communication interfaces 110 that support IEEE 802.11 protocols (including a, b, g, or n), single or dual band WiFi, BLUETOOTH communication, and near field communication (NFC). The CCD may include one or more operating systems, including versions of Android, Windows, Wyse ThinOS, Linux, or Apple iOS. The CCD may include one or more native applications, including, for example, a browser, a media player and recorder, voice over IP and video communication software, and software for remote access to cloud services or other remote content or services. The CCD may plug directly into a device (e.g. a display device such as a television, monitor, or projector), may be connected via a cable (via one of the above-described interfaces) to a device, or may be connected via a wireless interface to a device (e.g. a display or client device). A user may, for example, use the CCD to securely communicate; access files or contents that are on the CCD, on another local device, or on a remote device (e.g. in a server of a cloud services organization); or control, interact with, or mediate one or more local devices (e.g. client devices) or remote devices (e.g. remote client devices). The CCD may be remotely provisioned, authenticated, and controlled including, for example, by a cloud service.

Figure 2:
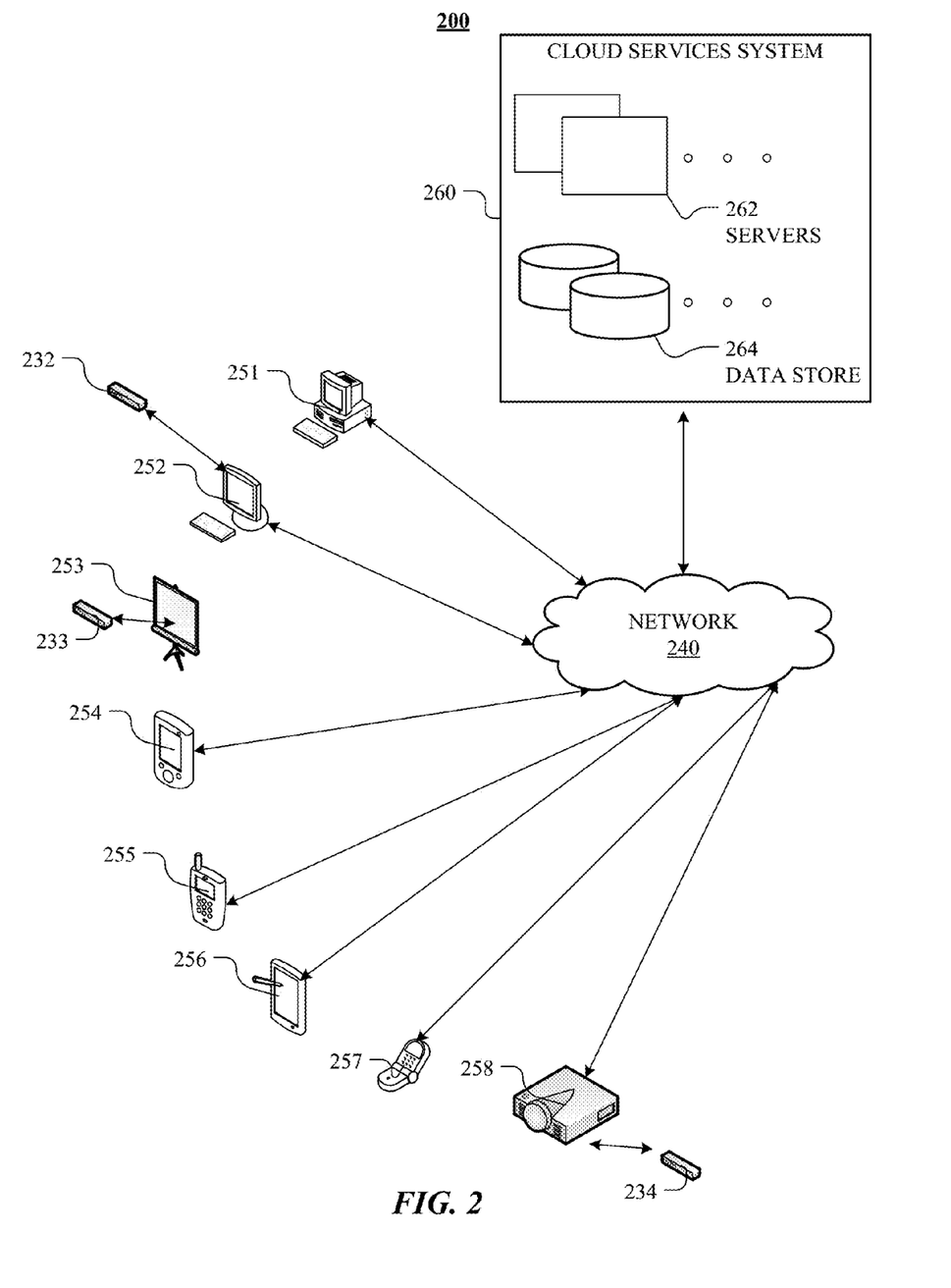
FIG. 2 is an example of a network environment in which a cloud client device may operate.

FIG. 2 illustrates an example network environment 200 in which a CCD may operate with other local or remote devices. In the example of FIG. 2, multiple devices and displays (e.g. elements 251, 252, and 254-258) are communicatively coupled (e.g. in any suitable wired or wireless fashion) to a network 240. Network 240 may be any suitable type of network including, for example, an ad hoc network, a personal area network (PAN), a local area network (LAN), a wide area network (WAN), a metropolitan area network (MAN), or one or more portions of the Internet or a combination of two or more of these network types. One or more portions of network 240 may be wired or wireless. As an example, network 240 may include portions of a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these.

As shown in FIG. 2, Network 240 may allow devices and displays coupled to it (e.g. elements 251, 252, and 254-258) to communicate with a cloud services system 260. Cloud services system 260 may, for example, include one or more servers 262 and a data store 264 including one or more data storage systems. Network 240 may also allow devices and displays coupled to it to communicate with each other. Although not illustrated in FIG. 2, one or more of the devices and displays of network environment 200 may, in particular embodiments, communicate with each other directly (e.g. wirelessly) or via any other suitable communication method.

In the example of FIG. 2, CCD 232 is coupled locally to computing device 252, CCD 233 is coupled locally to display 253, and CCD 234 is coupled locally to projector 258. As an example, CCD 232 may be wirelessly coupled to computing device 252 (e.g. via BLUETOOTH), CCD 233 may be coupled to display 253 via, for example, a USB port, and CCD 234 may be coupled to projector 258 via, for example, HDMI. Additionally, CCD 232, CCD 233, and CCD 234 may each communicate (or be coupled) with one another or with one or more devices or displays (e.g. elements 251-258) locally or directly (e.g. via NFC or BLUETOOTH), via their respective coupled devices (e.g. 252, 253, 258), via network 240, or via any other suitable communication method. Furthermore, CCD 232, CCD 233, and CCD 234 may each communicate with network 240 directly via any suitable communication method, without need of being coupled to a device (e.g. a display or a computing device).

In particular embodiments, the CCD is enabled to provide a wireless, remote interface for multi-platform control and mediation of one or more client or display devices (e.g. 251-258). The wireless, remote interface provided by the CCD may use any type of suitable wireless technology or standard including, but not limited to, IEEE 802.11 (a), (b), (g), and (n), WPS (Wi-Fi Protected Setup), BLUETOOTH, 3G and 4G mobile communication, and NFC. The platforms for each of the client or display devices (e.g. 251-258) may be the same or different and may include (by way of example and without limitation) Apple iOS, Microsoft Windows, Android, Wyse ThinOS, or Linux. Furthermore, each of the client or display devices (e.g. 251-258) may include a software application configured to interact with the CCD (e.g. 232, 233, or 234) or with other client or display devices.

The CCD may function with a client device (e.g. a keyboard, mouse, tablet, computer, or phone) and enable remote events at the client device to interact with or control the CCD, a remote client device, or a display device (e.g. a television, projector, or monitor). As an example, a wireless keyboard or mouse may be used with the CCD, with a remote display device displaying the input from the keyboard or mouse. As another example, CCD 233 may be coupled to display 253, and remote touch events from tablet 256 may control what is displayed on display 253. As another example, CCD 232 may be coupled to computer 252, and input (e.g. data or I/O from peripherals) may be directed by CCD 232 from computer 252 to display 253, tablet 256, and projector 258 simultaneously. In particular embodiments, inputs from a single client device (e.g. phone 254) may be communicated to the CCD (e.g. 232, 233, or 234), such that the user of the client device maintains control over the CCD (and a display device coupled to the CCD, e.g., monitor of computer 252, display 253, or projector 258), with the effect that the client device acts as a flexible wireless input device for the CCD. As an example, in a classroom setting, content displayed on an instructor's tablet client device (e.g. 256) may be shared with students via the CCD (e.g. 233) by having the display device (e.g. 253) simultaneously display or mirror the display of the instructor's tablet client device. The instructor may control the CCD via the tablet and manipulate the content shown on the display by using gestures (e.g. touch or multi-touch), soft keyboards, or touchpad functionality on the tablet.

In other embodiments, multiple client devices (e.g. keyboards, mice, etc.) may be used with one CCD, with the inputs from one or more of these devices simultaneously being processed by the CCD and in some circumstances displayed on one or more display devices. As an example, again in a classroom setting, an instructor may use a tablet client device, a first student may use a smartphone soft-keyboard, and a second student may use a BLUETOOTH keyboard, and the inputs from all of these devices may be received by a CCD and displayed on a display device such as a monitor. As yet another example, multiple people using multiple client devices (e.g. tablets or smartphones) may together play a single game (e.g. streamed from the Internet via the CCD) displayed on a single display device, with the inputs from each of the devices going to the CCD.

In particular embodiments, the CCD may be enabled to function with one or more multifunction display devices, such as multi-touch-enabled displays and/or displays with integrated webcams, speakers, microphones, etc. As an example, if the CCD is paired with a touch monitor (e.g. via a wired or direct plug-in connection to the monitor such as USB/MHL/HDMI, or via BLUETOOTH, NFC, or any other wireless technology), the CCD may be configured to operate directly with the display device, allowing a user to input touch gestures directly on the display device and interact with data displayed on the display device by the CCD. For example, if the user is navigating a website using a browser via the CCD, and the CCD is paired with a touch display device, the user may directly touch the display device to interact with the website, and the CCD will recognize and properly process the touch inputs. In other embodiments, the user may operate both a touch display device and one or more separate client devices (e.g. mouse, keyboard, tablet, or smartphone) simultaneously, such that the user may input data via any or all of the client devices or display devices.

In particular embodiments, the CCD may be enabled to function in a unified communications framework. As an example, the CCD may be enabled to function with services such as instant messaging (e.g. including presence information), telephony (e.g. IP telephony), video conferencing, data sharing (including Interactive White Boards), IPTV, call control (e.g. for VoIP), speech recognition, and unified messaging. In particular embodiments, the CCD may be enabled to function with (e.g. send data to and receive data from) one or more display devices that include cameras. As an example, if the CCD is paired with a television including a camera (e.g. a built-in camera or webcam), microphone (e.g. built-in or attached as a USB peripheral), and an audio out (e.g. built-in speakers or speakers attached as peripherals), the CCD may be configured to operate directly to allow a user to engage in videoconference calls. The configuration may, for example, occur in conjunction with a cloud services provider (e.g. cloud services system 260), described further herein. As an example, the cloud services provider may allow the CCD to set up a SKYPE session, and link the user of display 253 to another user via the videoconference. The CCD may operate with various types of display devices with various types of functionality including, but not limited to, multi-touch gestures, GPS or other location data, audio functionalities (including microphones and speakers), or camera input. In some embodiments, the CCD is enabled to communicate with such additional components of the multi-function display device via the same interface over which it sends display information (e.g. MHL via an HDMI interface). In other embodiments, the CCD is enabled to communicate with such components via an interface distinct from the display interface (e.g. the CCD may send display information to the display device via an HDMI connection and may receive multi-touch input information from the display device via a separate USB connection).

In particular embodiments, the CCD is enabled to provide a wireless, remote interface including gesture redirection (e.g. touch or multi-touch gestures) or input/output redirection (e.g. of any suitable type including those listed herein) in conjunction with one or more devices. The CCD, for example, may provide a virtualized touch interface. The CCD may function with a client device (e.g. a smartphone, tablet, laptop, etc.) to redirect multi-touch gestures from the client device to control or otherwise interact with a display device or another client device. For example, a user of a smartphone may swipe, fling, use multiple-finger touch inputs (including, e.g., from a soft-keyboard), pinch-to-zoom, scroll, etc. on the smartphone. These multi-touch gestures may be received by the CCD (e.g. by a multi-touch client receiver) and used to control or interact with one or more display devices or client devices (e.g. via a multi-touch gesture proxy controller and a native display driver of the display device). As an example, input from one client device (e.g. a user's pinching multi-touch gesture at tablet 256) may be sent to a CCD (e.g. 232), which then exports the input to control the operation of another client device (e.g. to cause a zoom in on an image displayed in a browser running on computer 252). In this example, the output displayed on computer 252 may then be sent to the CCD 232 and displayed on tablet 256. As described above, multiple client devices may be used with one CCD in certain embodiments, with the multi-touch inputs from one or more of these devices being simultaneously displayed or used to control on one or more display or client devices.

The types of input gathered from client devices (e.g. 251-258) may be any type of input including, but not limited to, gestures (e.g. touch or multi-touch gestures, described herein), keyboard input, mouse input, accelerometer input, gyroscope input, GPS or other location data, camera input (video or still images), sound input (e.g. from a microphone), or input from any suitable type of sensor including, e.g., acoustic, sound, vibration, chemical, electric, magnetic, radio, environmental, navigation, optical, pressure, temperature, or proximity sensors. Any suitable input from a client device may be sent to a CCD, which may then send this input to any other client device (including any peripheral or other component of the client device), display device, remote device, etc. As an example, a user's voice input at phone 255 may be sent to a CCD (e.g. 233) which then sends that voice data to be played on a speaker at computer 251.

In particular embodiments, a CCD may be configured to translate inputs between devices. In this manner, resources, features, and functionality of one device may be made available to another device via mediation by the CCD using, for example, a transparent wireless transport protocol (e.g. WiFi or BLUETOOTH). For example, inputs received at a first device, such as a smartphone, may be intercepted, communicated to the CCD, translated into a format understood by a second device or application, and provided to that second device or application. As an example, a gesture or an input may be translated to multi-touch at a device, and vice versa. As another example, voice input from a first device (e.g. at a microphone) may be translated to text at a second device, and vice versa. As yet another example, a gesture at a first device (e.g. captured by a camera) may be translated to an action (e.g. scrolling) at a second device. In some cases, the device or application receiving the remote inputs may be able to receive and process those inputs in their original format. In such cases, the inputs need not necessarily be translated, but may be redirected by the CCD.

In particular embodiments, a CCD may be configured to provide virtual sensors (or other functionality) to a client device or display (e.g. in a manner similar to a virtual USB hub). As an example, if CCD 233 is coupled (e.g. plugged into a USB port) with display 253, then CCD 233 may dynamically construct a virtual set of sensors and other devices (e.g. 251, 252, and 254-258) for use by display 253. That is, CCD 233 may determine what other devices (and what sensors on those devices) are available for pairing by, for example, conducting a scan to see if the local network contains pairable devices (e.g. devices within a communication range for pairing). For those pairable devices, the CCD 233 may request the devices to enter a pairing mode and then scan (e.g. NFC tags, or other pairing methods) to construct a model of available devices or sensors (e.g. a mesh). The CCD 233 may then pair those with display 253 and provide functionality or services from those devices or sensors to display 253. As an example, CCD 233 may couple a phone (e.g. 254) with display 253, such that if a user at display 253 using CCD 233 needs her location information (e.g. to authenticate an account with cloud services system 260), the GPS module of phone 254 may be seamlessly used to provide location information and authenticate CCD 233. In this manner, a user need not manually couple or otherwise pair local devices, download drivers manually, or do other manual configurations of CCD 233 or display 253.

In particular embodiments, the CCD may be enabled to operate in conjunction with cloud (or other remote or virtualized) services. As examples, the CCD may include software that enables it to function with the Dell Wyse Cloud Client Manager or Dell Wyse PocketCloud software, or any other suitable remote or cloud service.

As an example, the CCD may be enabled to operate with a cloud service (e.g. 260) such as the Dell Wyse Cloud Client Manager (Dell CCM). Through the cloud service, the CCD may be remotely provisioned and authenticated. The cloud service may provide, for example and without limitation, access to data, applications, services, or remote desktops.

In particular embodiments, the CCD may be authenticated using a variety of methods including WiFi Protected Setup (e.g. by using a WPS certified router to establish connectivity to the cloud service), an SD Card or USB source (or any other local source) of a configuration file, or a client device. As an example, a token stored on a particular client device may be required to authenticate a user attempting to access a CCD. When the client device (e.g. a smartphone, tablet, laptop, etc.) supporting BLUETOOTH, NFC, or other wireless technology is brought into proximity with the CCD, the CCD may obtain a secure or encrypted token (e.g. an RSA token) from the client device over the wireless interface. Once this secure token is obtained, the CCD may then authenticate its credentials with the cloud service.

The CCD may, for example, send particular data to the cloud service for authentication. The data may include, for example, the security token, location of the CCD (determined, e.g., based on data from a GPS transmitter of the CCD or MAC address scanning), an IP address of the CCD, a MAC address of the CCD, a usage log of usage behavior or statistics associated with the CCD, software or hardware versions of components of the CCD, etc. Based on the data received from the CCD, the cloud service may construct a profile associated with the CCD (e.g. stored in data store 264) or, alternatively, find and analyze (e.g. via servers 262) an existing profile associated with the CCD. For example, the CCD may be associated with a particular user of the cloud service, and particular security, authentication, quality-of-service, access, encryption, or other settings or data may be associated with the user in the user profile for the cloud service. The profile associated with a CCD in the cloud service may be specific to a user associated with the CCD, an entity associated with the CCD (e.g. a corporate profile with corporate settings), or any other individual, group of individuals, or organization associated with the CCD. Furthermore, if the CCD is not associated with a profile in the cloud service, the cloud service may use certain default settings to authenticate or provision the CCD.

In particular embodiments, when the cloud service receives data from the CCD, the cloud service may determine which user the CCD is associated with (e.g. based on a MAC address of the CCD), examine the profile for this user, and authenticate and provision the CCD based on data in this profile. As an example, the cloud service may determine that the CCD is associated with a user whose profile only allows cloud service access within a particular geographical region. If, for example, the CCD is presently in South America (as determined, for example, from the CCD's IP address or by approximating the location of the CCD by analyzing the wireless networks within the range of the CCD), but the profile for the user associated with the CCD allows CCD access to the cloud service and data only within North America, then the cloud service may refuse to authenticate the CCD. Any appropriate security measure may be enforced by the cloud service based on data associated with the CCD or the cloud service user profile. As another example, the user profile may include white- or black-lists that detail websites, cloud services or applications that the user may be able to access (or may be denied access to) depending on the location of the CCD or depending on other information associated with the CCD (e.g. processes currently running on the CCD).

In addition to allowing or denying access to cloud services or applications, the CCD may be remotely wiped (e.g. to a reset or clear state for re-imaging), locked, or queried (e.g. a query to determine the location of the CCD) by the cloud service, including, e.g., by a cloud service administrator. In particular embodiments, the CCD may be remotely wiped if another client device (e.g. a smartphone) is not within a particular range of the CCD. In particular embodiments, a specific standard method for wiping by overwriting the file system of the CCD may be employed such that the CCD may not be recoverable by a third party. This may be administered by the cloud service, or may be independently deployed. The CCD may be completely wiped (e.g. to factory settings) if certain conditions are met (e.g. if the cloud service determines the CCD should be wiped). In other embodiments, the CCD may be wiped in a manner that leaves all cloud-services-installed applications on the CCD but removes everything else. In particular embodiments, certain zones of the memory or storage of the CCD may be wiped, and in other embodiments, the entire CCD may be wiped.

The CCD may be fully imaged and the operating system of the CCD may be fully recovered via the cloud service even if the CCD is wiped or reset at an earlier time (e.g. by the cloud service for security reasons). The CCD may have any type of profile settings, content, or connections automatically pushed to it from the cloud service. The CCD may receive system updates from the cloud service including, for example, firmware or application updates. These updates may be determined based on information in the cloud service profile associated with the CCD, as well as information received from the CCD. The cloud service may also manage files on the CCD, as well as partition the CCD (e.g. into personal and corporate segments with separate profiles). The data transferred between the CCD and the cloud service may, for example, be encrypted using standard encryption, proprietary encryption, or a combination of both types. The cloud service may implement various policies or rules on the CCD after authenticating and provisioning the CCD. For example, the cloud service profile associated with a CCD may include policies related to quality-of-service, such that the cloud service may track data usage of the CCD and may implement quality-of-service data usage policies on the CCD. In addition to using the cloud service, the recovery of data on the CCD or the upgrading or updating of software on the CCD may be accomplished in the following ways:

1) Manually via the CCD itself (e.g. using a wireless interface in the CCD to automatically retrieve data, e.g., from a cloud service or from the Internet)
2) Connecting the CCD to a PC (e.g. obtaining data stored on the PC or using a web-based application on the PC to repair or update the CCD without needing to download any data to the PC)
3) Using data stored on a MicroSD (or other type of storage) card operable with the CCD, or
4) Using a purely web-based remote update mechanism to remotely send data to the CCD.

The CCD may be operable to access other types of remote networks or services, as well as cloud services. For example, the CCD may be fully pre-configured to access a virtual private network (VPN), for example by the owner of virtual private network (e.g. a corporation whose employees are issued pre-configured CCDs). Thus, in particular embodiments, the CCD may have automatic VPN provisioning without any need for user input or configuration. The automatic VPN provisioning may occur, in particular embodiments, through the authentication or provisioning process by a cloud service, described above, and may, for example, provision based on a user's profile. Additionally, in combination with other capabilities of the CCD described herein, a user at one location on the VPN network may connect to services from a device at another location on the VPN network (e.g. a printer in a private office network), allowing for any device to remote its functions over both local networks and VPNs, as well.

In particular embodiments, the CCD may be enabled to operate with multiple types of security protocols. As an example, the authentication of the CCD by receipt of a security token from a client device via BLUETOOTH or NFC (as described earlier in detail) may be a first level of security. A second level may be imposed through a cloud service authentication of the CCD (e.g. through the cloud service analysis of data provided by the CCD and through profile data associated with the CCD). Additionally, the links between the CCD and the cloud service (or any other links) may be encrypted using any suitable standard or proprietary encryption techniques. Finally, at any of these steps, a PIN or log-in may be required for a particular user using the CCD, as it is contemplated that multiple users may be associated with a single CCD, or that a single user may have separate profiles (e.g. work and personal) for a single CCD.

These security measures may enable the CCD to act as a portable and secure computing device even when highly confidential material is involved. Even if an unauthorized person obtains a CCD, obtains the client device with the secure token required for authentication of the CCD, and obtains all necessary log-in information to operate the CCD, the owner of the CCD may remotely disable and/or wipe the memory of the CCD via a cloud service (e.g. via Dell CCM). Moreover, as mentioned above, the CCD may be configured to automatically set up appropriate connections and communications sessions upon initialization and authentication, including automatic configuration of a VPN via a cloud service. A CCD may thus be configured to automatically present the user with a remote desktop (in conjunction with well-known virtualization and/or cloud computing software, such as that provided by Citrix and VMWare) that is similar to or identical to the desktop environment on the user's networked office computer. The CCD thus presents the possibility of low-cost, highly portable, highly secure, and broadly compatible computing.

The CCD may be enabled to operate with client-to-client software such as Dell Wyse PocketCloud software. The client-to-client software may, in particular embodiments, be used in conjunction with one or more cloud or remote services (e.g. the Dell Wyse Cloud Client Manager described above).

In particular embodiments, the CCD may be enabled to operate with client-to-client software that enables the CCD to see, communicate with, and otherwise interact with (or control) other client devices and their contents. As an example, multi-touch redirection, described above, may be implemented using the client-to-client software on the CCD and other devices. As an example, the CCD may include an application that allows the CCD to discover and access content across multiple client devices. Each of the devices may, for example, run an instance of the application, and each device may recognize and access other devices over BLUETOOTH, IEEE 802.11, ad-hoc wireless networking, IP networks, 3G or 4G connectivity, etc. The connection between these devices may, in particular embodiments, need not ever go to a cloud service, the Internet, or any other remote network and may, for example, be done entirely in a peer-to-peer fashion. In other embodiments, the connection between these devices may occur in part over a remote network. The client-to-client software may, for example, include a browser (e.g. Chrome) that allows the CCD and other devices to share a single content display (e.g. a single streaming video) as well as to share the control of content on one or more displays (e.g. a multi-player video game in which input is received from multiple client devices). The client-to-client software may allow the CCD and other devices to search and share applications or files (including video, audio, etc.); stream files; or copy, move, and backup files among each other. The client-to-client software may also allow the CCD and other devices to create a shared drive that is either public or private. The client-to-client software may, for example, also include auto-discovery, network management, file management (e.g. download, upload, copy, move, delete, rename, stream, or preview, etc.), and file transcoding (e.g. pause, play, fast forward, rewind, etc.) capabilities. The CCD may act as a router or central point through which any or all of the client-to-client activities or traffic may pass. In particular embodiments, the client-to-client software may also include an application (e.g. Dell Wyse Freezer, or any other HTML5 client) that allow the client devices to access proprietary applications (e.g. a remote Windows desktop, applications, or files) via a web application browser.

The CCD may be a low-power device. The CCD may receive power in accordance with the MHL 1.0 standard, or in accordance with subsequent revisions of the MHL standard. This allows the use of a single physical interface that may both provide power to the CCD and serve as the communications interface between the display device and the CCD. In other embodiments, the CCD may be powered via a separate interface, such as a USB port (e.g. connected to the display device or to another USB-enabled device), or via an A/C adapter. A CCD may also be configured to be broadly compatible and to receive power via any of these interfaces, depending on which is available.

In particular embodiments, an organization (e.g. a corporation) may have multiple client devices or display devices (e.g. digital signs or kiosks) that it wishes to use for one or more dedicated purposes. As an example, some digital signs or kiosks may be used exclusively to display building maps, while others may be used to display only particular content (e.g. photos, videos, or presentations in a looped format). As another example, a digital kiosk may allow users to operate only particular applications, such as a price look-up application or a cash register application that allows a user to pay for purchases in a commercial setting. In particular embodiments, it may be desirable to configure a client device or display device to meet specific custom requirements (e.g. requirements of the organization) with respect to content or applications available for a user of the client device or display device. The client device or display device (e.g. a digital sign or kiosk) may, for example, run the standard version of the Android operating system, which may not already include required customizations for a particular organization. In other embodiments, the client device or display device may run no operating system at all (e.g. in the case of a simple monitor).

In particular cases, customizing a client device or display device (e.g. a digital sign or kiosk) to specific requirements (e.g. of a particular organization) when the device runs no operating system or only the standard Android operating system may be difficult, error prone, or otherwise challenging. For example, on a standard commercial device running the Android operating system with the addition of a customized application (such as, e.g., a tablet or display device operating in kiosk mode), a user may press the "home" or "back" button on the device, allowing the user to gain full operating system access. The user may then switch away from the custom application to access other areas of the device, which may be unwanted by the organization maintaining the device. Furthermore, a user may also be able to disable the network connections of the device (e.g. by putting the device in "airplane mode"), preventing the device from performing its intended functions for future users. Additionally, notifications sent to the device (e.g. operating system-level push notifications, network-originated push notifications, etc.) may also allow a user of the device to exit the customized application, which may be undesirable. If an organization uses a vendor-provided management interface (e.g. to operate with Mobile Device Management (MDM) software) on each of its client devices or displays, this may require added expense, and may also limit the choice of Android hardware that may be used, as each vendor and product may have only certain management features. Finally, if an organization chooses to use a custom firmware solution for each of its client devices or displays, this may entail even more added time and expense.

In particular embodiments, a CCD may function with a client device or a display device including, for example, a digital sign or a kiosk. The CCD may be configured according to specific or custom requirements, such that the client device or display device may function as desired (e.g. as a digital sign or kiosk). This may be done in a single step configuration process, potentially across multiple CCDs or devices, potentially alleviating one or more of the problems discussed herein with respect to configuring client devices and display devices. This may also be done in a manner that prevents malicious configuration attempts by providing the option of encrypted configuration data.

In particular embodiments, a custom configuration including content, policies, and applications may be applied from a storage medium (e.g. an SD card, a USB drive, or an external hard disk) or from a remote location (e.g. a cloud services system or a network location) to a CCD operating with a client device or display device (e.g. a tablet, a monitor, a television, etc.). In particular embodiments, the storage medium may be coupled to a CCD, and the CCD may be coupled to the client device or display device. Although the description herein focuses on the embodiment in which a CCD is coupled to a client device or display device, in yet other embodiments, the storage medium may be connected directly to the client device or display device (e.g. a tablet).

The configuration of a CCD (e.g. coupled to a client device or display device) for the first time proceeds as follows. First, the CCD monitors configurations events (e.g. the insertion of an SD card or other form of local storage, or the receipt of a configuration file from a network location or a cloud services system). The CCD then determines if a configuration event (e.g. a new configuration) is detected. The very first time the CCD detects a configuration event in its operating lifetime (e.g. before the CCD is custom-configured), the CCD obtains a security key associated with this first custom configuration and stores this security key. The CCD is then configured using the content, applications, and policies presented in the custom configuration. The custom policies may be determined by the organization in control of the CCDs and may including any suitable policies such as, e.g., application whitelists or blacklists, particular operational behaviors (such as ignoring Android-default behaviors like going to a lock-screen after a period of inactivity), preventing a user from being able to access device settings, preventing a user from being able to modify the operation of the device, etc. After its original configuration, in the future, any time the CCD detects a configuration event (e.g. the insertion of an SD card or the receipt of a configuration wirelessly) the CCD proceeds through an authentication process in which the security key presented in the present configuration is compared to the stored security key associated with the original configuration. Only when the security key of the present configuration matches that of the stored configuration will the CCD be reconfigured with the newly-presented configuration. In addition to the security key (which may include any suitable security key including, for example, a token or code) the CCD may require one or more passwords or other forms of authentication before allowing itself to be reconfigured. In this manner, an organization may ensure that only authorized users and authorized configurations may be applied to CCDs (and the client devices or display devices they operate with). As another security precaution, the CCD may include time- or event-based security key removal to prevent leakage of security keys. For example, if an SD card including a configuration (and a configuration key) is left in a CCD for more than a threshold amount of time (e.g. 15 minutes), the CCD may invalidate this key and may, for example, communicate to a cloud services system or central server (or to other CCDs directly) that the key has been compromised and is invalid. This can prevent unauthorized access to a security key. Similarly, if a particular event is detected (e.g. from a pre-defined category of events associated with unauthorized access), then the CCD may again invalidate the key associated with the current configuration. As yet another security precaution, the configurations themselves may be encrypted, and the CCD alone may perform decryption of the configuration files, preventing an unauthorized party from intercepting the configuration (e.g. including the case in which the configuration is wirelessly transmitted to the CCD from a cloud services system or a remote network location).

In this manner, any time an organization wishes to update content, applications, or policies (including, e.g., providing new Wi-Fi passwords) on its CCDs (including those devices to which the CCDs are coupled—such as digital signs or kiosks), the organization may simply provide updated content, applications, or policies in configurations, either in local storage form (e.g. SD cards that are physically coupled to the CCDs) or across a network (e.g. deploying the updates via a cloud services system or from a network location). In particular embodiments, a cloud services system will send notifications (e.g. events via a cloud messaging system) to the CCD that notify the CCD of new configurations, or the CCD may be instructed to check-in at some periodic interval with the cloud services system to verify its current configuration and determine whether a new configuration is needed.

In order to enable an Android-based CCD coupled to a client device or display device to be customized to perform only certain functions via a custom configuration as described herein, particular modifications may be made to the standard Android operating system. First, the standard Android start-up sequence may be modified such that a local, external file system (including, e.g., an SD card, a USB drive, a hard drive, or any other suitable storage including a file system) may be queried by the CCD coupled to the client device or display device before any user interaction is recognized or any applications are launched. This prevents the situation in which a user attempts to interact with the CCD before it is properly configured, e.g., via a local storage. Second, the standard Android network-connectivity sequence is modified such that the CCD may look for network-based boot options (e.g. DHCP or PXE boot options) before any user interactions are recognized or any applications are launched. Third, the Android boot loader of the CCD may be secured or locked, such that modifications may not be allowed by an unauthorized user. Furthermore, the "home" screen (or "launcher") of the Android operating system may also be modified. In the standard Android operating system, when the CCD starts up, the launcher is the first application available for user interaction, and it is also the application that remains visible when all other applications are closed. In particular embodiments, the launcher may be modified to start system services that check if a configuration is available on any data transport medium (e.g. SD card, USB drive, hard drive, network location, etc.). If a new configuration is discovered, then a management library is called. Additionally, in particular embodiments, after 15 minutes of run time with a particular security key (e.g. specific to the CCD's original configuration), the security key may be deleted from the CCD to improve security.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method of a cloud client device comprising:
monitoring for one or more configuration events of the cloud client device;
identifying a configuration event from the one or more configuration events;
identifying a configuration associated with the configuration event;
determining a first security key associated with the configuration;
comparing the first security key with a stored security key associated with a previous configuration;
configuring the cloud client device in accordance with the configuration based, at least in part, on the comparison of the first security key and the stored security key, wherein the configuration comprises at least an application;
preventing user access to one or more settings of the cloud client device based, at least in part, on the configuration;
comparing an amount of time associated with a presentation of the first security key to a predetermined threshold amount of time;
wherein the configuration event is caused by connection of a local storage device to the cloud client device;
comparing an amount of time that the local storage device has remained connected to the cloud client device since a presentation of the first security key by the local storage device to a predetermined threshold amount of time;
invalidating the first security key based on the comparing of the amount of time; and
communicating to a cloud services system the invalidation of the first security key.

2. The method of claim 1, further comprising communicating with a digital sign or kiosk.

3. The method of claim 1, further comprising:
storing the configuration, wherein the configuration is stored on at least one of the following:
a USB device coupled to the cloud client device;
an SD card coupled to the cloud client device; or
a hard disk coupled to the cloud client device.

4. The method of claim 1, wherein the configuration comprises one or more of the following:
one or more applications;
digital content; or
one or more policies.

5. The method of claim 1, wherein the stored security key is associated with the original configuration of the cloud client device.

6. The method of claim 1, wherein the configuration event is associated with the insertion of an SD card comprising a configuration of a pre-determined type into the cloud client device.

7. A method of a cloud client device comprising:
monitoring for one or more configuration events of the cloud client device;
identifying a first configuration event from the one or more configuration events;
identifying a first configuration associated with the first configuration event;
storing a first security key associated with the first configuration;
identifying a second configuration event from the one or more configuration events;
identifying a second configuration associated with the second configuration event, wherein a second security key is associated with the second configuration;
configuring the cloud client device in accordance with the second configuration based, at least in part, on a comparison of the first security key and the second security key, wherein the configuration comprises at least an application;
preventing user access to one or more settings of the cloud client device based, at least in part, on the second configuration;
wherein the second configuration event is caused by connection of a local storage device to the cloud client device;
comparing an amount of time that the local storage device has remained connected to the cloud client device since a presentation of the second security key by the local storage device to a predetermined threshold amount of time;
invaliding the second security key based on the comparing of the amount of time; and
communicating to a cloud services system the invalidation of the second security key.

8. The method of claim 7, wherein the cloud client device communicates with a digital sign or kiosk.

9. The method of claim 7, further comprising:
storing the configuration, wherein the second configuration is stored on at least one of the following:
a USB device coupled to the cloud client device;
an SD card coupled to the cloud client device; or
a hard disk coupled to the cloud client device.

10. The method of claim 7, wherein the second configuration comprises one or more of the following:
one or more applications;
digital content; or
one or more policies.

11. The method of claim 7, further comprising restricting user access to one or more functions of the cloud client device.

* * * * *